Dec. 1, 1931. A. C. HOLLIS 1,834,243
TRUCK BODY
Filed March 5, 1931 3 Sheets-Sheet 1
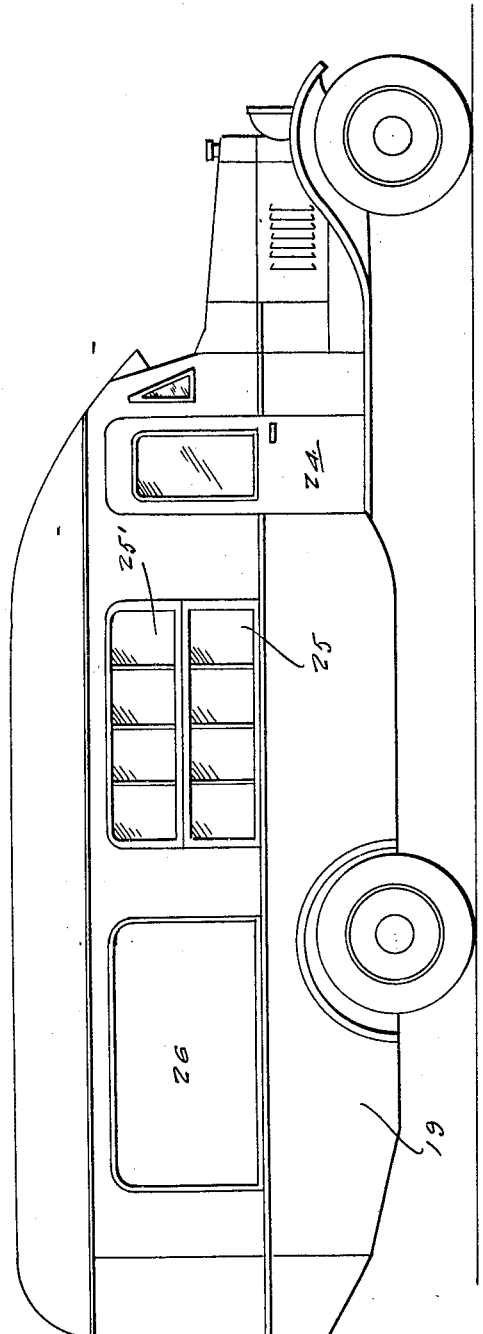
Inventor
A. C. Hollis
By Clarence A. O'Brien
Attorney Dec. 1, 1931.  A. C. HOLLIS  1,834,243
TRUCK BODY
Filed March 5, 1931   3 Sheets-Sheet 2
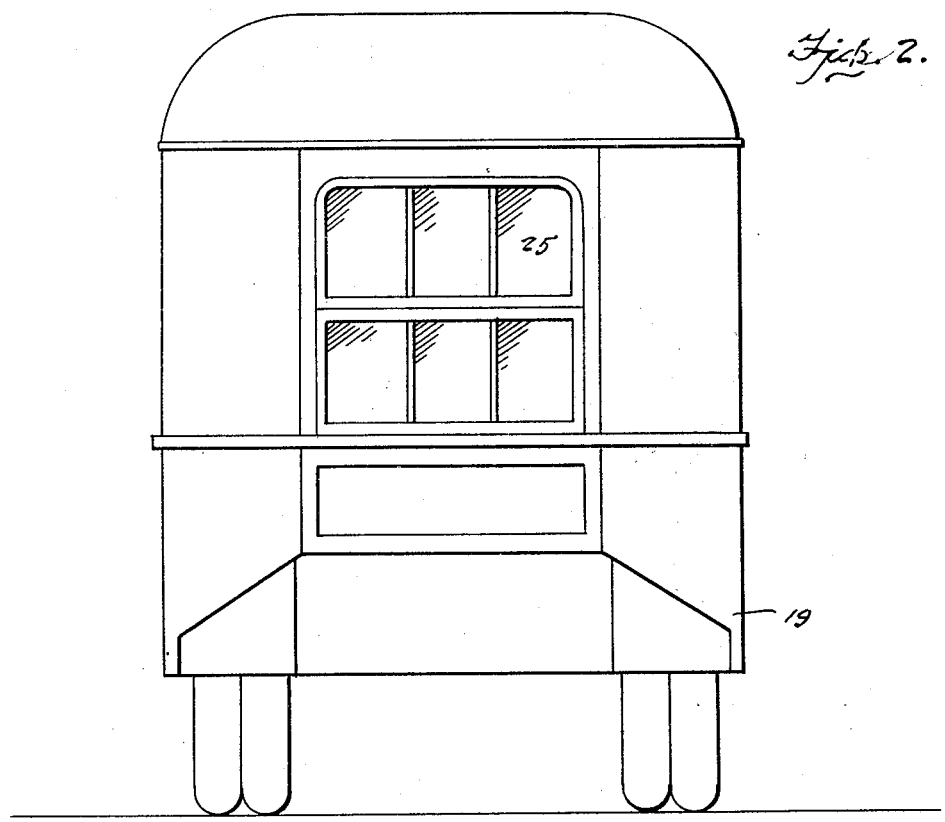
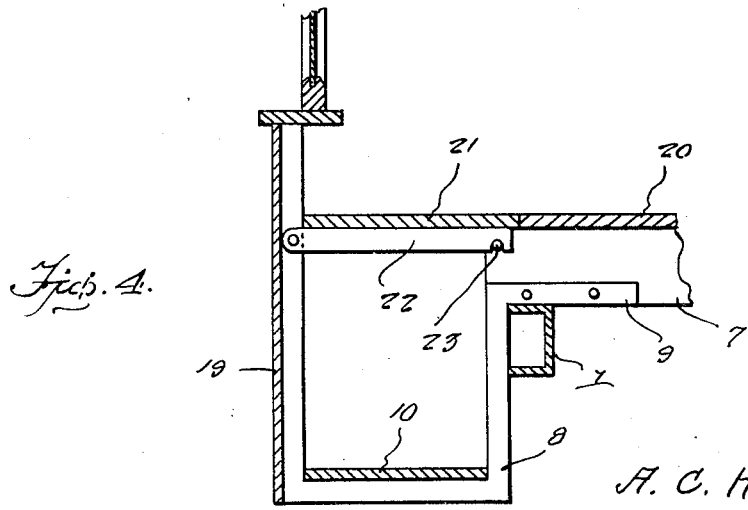
Inventor
A. C. Hollis
By Clarence A. O'Brien
Attorney Dec. 1, 1931.  A. C. HOLLIS  1,834,243
TRUCK BODY
Filed March 5, 1931   3 Sheets-Sheet 3

Inventor
A. C. Hollis

By Clarence A. O'Brien
Attorney

Patented Dec. 1, 1931

1,834,243

UNITED STATES PATENT OFFICE

ARTHUR C. HOLLIS, OF HARTFORD CITY, INDIANA

TRUCK BODY

Application filed March 5, 1931. Serial No. 520,361.

This invention relates to a truck body, the general object of the invention being to provide a body for a truck or the like which can be used in transporting articles such as groceries, and the articles sold from the truck, so as to provide a sales car as well as a delivery car.

Another object of the invention is to so form the body, that all space within the same is utilized.

Another object of the invention is to provide a runway or walk at one or both sides of the body which is below the main floor thereof, so that one can pass from the front of the truck to the rear thereof and vice versa without leaving the body and without stooping, with means for covering said runway or each runway, by part of the regular flooring when desired to make the entire flooring flat and on the same level.

A further object of the invention is to so form the parts that the framing can be readily taken apart and shipped in knock-down condition and then assembled at the point of use.

The invention also consists in certain other features of construction and in the combination and arrangement of the several parts, to be hereinafter fully described, illustrated in the accompanying drawings and specifically pointed out in the appended claim.

In describing the invention in detail, reference will be had to the accompanying drawings wherein like characters denote like or corresponding parts throughout the several views, and in which:—

Figure 1 is an elevation of the improved truck.

Fig. 2 is a rear view thereof.

Fig. 4 is a detail sectional view showing the runway and the means for supporting a section of flooring which covers the runway when the same is not being used.

Figure 3:
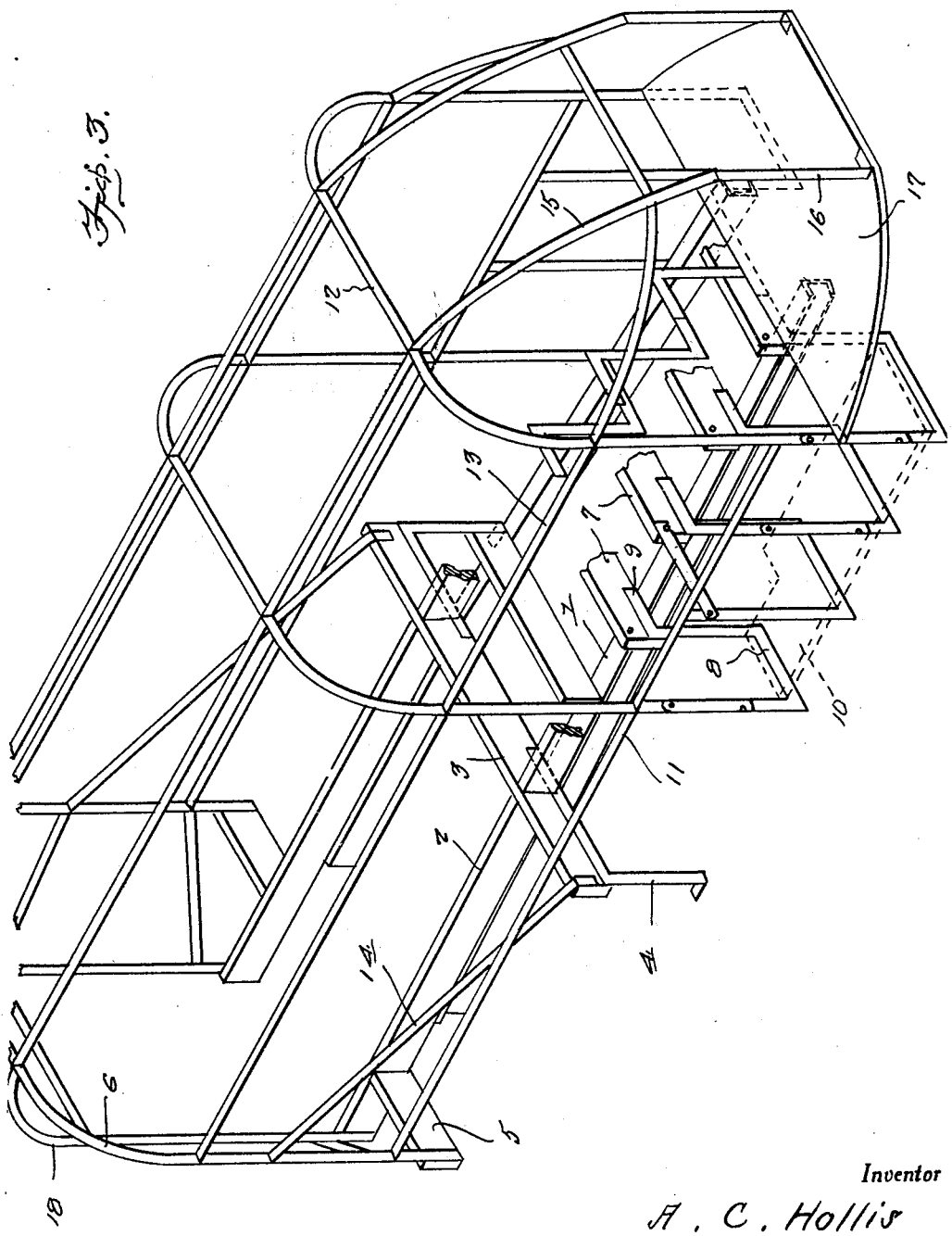
Fig. 3 is a perspective view of the framing.

In these drawings, the side members of the chassis of the truck are shown at 1 and side beam 2 is fastened to each of the members 1 and an intermediate cross beam or sill 3 is supported by the beam 2, said beam 3 extending beyond the side members 1 and the beams 2, and has attached to its ends the depending brackets 4, to which are attached the rear ends of the rear fenders and a part of the covering means.

An outwardly extending cross beam 5 has its inner end connected to each of the beams 2 adjacent the rear end of the beam, and these beams 5 have attached to their outer ends, the lower ends of the rear arch 6 of a part of the frame. Sills 7 extend crosswise of the side members 1. The drawings only show some of these sills and these sills 7 have their ends substantially flush with the outer sides of the members 1.

A substantially U-shaped bracket 8 has a horizontal extension 9 at the top of the inner limb which is connected to each end of each of the sills 7 so that these brackets extend well below the cross members 1 to form parts of a drop floor at each side of the truck, the bights of the brackets supporting the flooring, 10.

The upper ends of the outer limbs of the brackets are connected to a longitudinally extending member 11 of the frame, the rear end of which is connected to the part 6 and arches 12 forming part of the frame are connected to these members 11. Other longitudinally extended members of the framing are shown at 13 and are connected to the arches and brace members 14 connect the outer ends of the beam 3 to the rear arch 6. The front of the framing is formed by the curved members 15 and the upright portion 16, this front part of the frame being located above the floor 17 of the front of the truck.

The reduced rear portion of the body is formed by the frame parts shown generally at 18. As before stated, I prefer to form the framing of detachable parts so that it can be knocked down for shipment or storage and then assembled at the point of use, and the framing can be covered by panels of suitable material as shown generally at 19.

The main floor of the body is shown at 20 and the removable part thereof is shown at 21, which removable part covers the drop floor composed of the brackets 8 and the flooring 10 and is supported by the pivoted members 22, each of which is pivoted to an outer limb of the bracket 8 and notched at its free end for engaging a pin 23 on a sill 7.

Thus when the runways or walks 10 are not to be used, these removable sections of flooring 21 may be put in place so as to form side sections for the main flooring 20. However, when one wishes to pass from the front of the truck to the rear thereof, or vice versa, the removable sections 21 are removed, the members 22 being swung out of the way, so that one can use the walk or runway 10 without leaving the truck and without stooping.

The runway enables the truck to be made of comparatively low height.

The body is provided with the usual door 24 and windows 25 and the windows 25' may be used for dispensing articles or objects sold from the truck and the panels 26 may be made removable so that screens may be placed in the openings left by the removal of the panels when desired.

The peculiar shape of the framing will support and add strength to the movable body and yet permit enough flexibility to prevent cracking or breaking of the outer covering, and it will of course be understood that the framing may be formed differently from the framing shown in Fig. 3, and in accordance with the uses to which the body is to be put.

As before stated, this truck can be used as a salescar for delivering and selling groceries, or any other objects or articles and it can be used by tourists as a ticket office, etc.

It is thought from the foregoing description that the advantages and novel features of the invention will be readily apparent.

It is to be understood that changes may be made in the construction and in the combination and arrangement of the several parts, provided that such changes fall within the scope of the appended claim.

Having thus described my invention, what I claim as new is:—

A truck of the class described comprising a chassis, transverse beams supported on the chassis adjacent the front part thereof, a flooring top portion resting on the beams, a plurality of substantially U-shaped members at each side of the chassis and each member having a horizontal extension connected with the upper end of the inner limb thereof and fastened to a beam, a longitudinally extending member at each side of the truck to which the upper end of the outer limb of the U-shaped members are connected, a body having the side uprights thereof connected with the longitudinally extending members, a flooring supported by the bight part of the U-shaped members, side parts connected to the outer limbs of the U-shaped members for enclosing the runways formed by said U-shaped members and the flooring supported thereby, a bar pivotally connected to the outer limb of each U-shaped member adjacent the top thereof, means on the beams for holding the pivoted bars in horizontal position when the free ends of such bars are engaged with such means, and removable flooring supported by such pivoted bars, when the same are in horizontal position.

In testimony whereof I affix my signature.

ARTHUR C. HOLLIS.